Nov. 1, 1927.

H. E. NICHOLS

PORTABLE ELECTROCARDIOGRAPH

Filed July 2, 1920

1,647,710

2 Sheets-Sheet 1

Patented Nov. 1, 1927.

1,647,710

UNITED STATES PATENT OFFICE.

HORACE E. NICHOLS, OF BALTIMORE, MARYLAND, ASSIGNOR OF ONE-HALF TO CLYDE H. CHASE, OF DETROIT, MICHIGAN.

PORTABLE ELECTROCARDIOGRAPH.

Application filed July 2, 1920. Serial No. 393,716.

My invention relates to portable electrocardiographs.

Among the objects of my invention are:—

To produce an electro-cardiograph which shall be simple, cheap, effective and of such a weight and size as to be readily portable.

To produce an electro-cardiograph which shall indicate or record the electric potential developed during auricular and ventricular systole, or during a molecular or atomic change of any material.

In the following specification I shall describe my cardiograph as used for indicating or recording the electrical potential during auricular and ventricular systole, but it is to be understood that my cardiograph can be applied for indicating the potential developed during the operation of any muscular fibre whether resident within a human body or the body of any of the lower animals.

Figure 1:
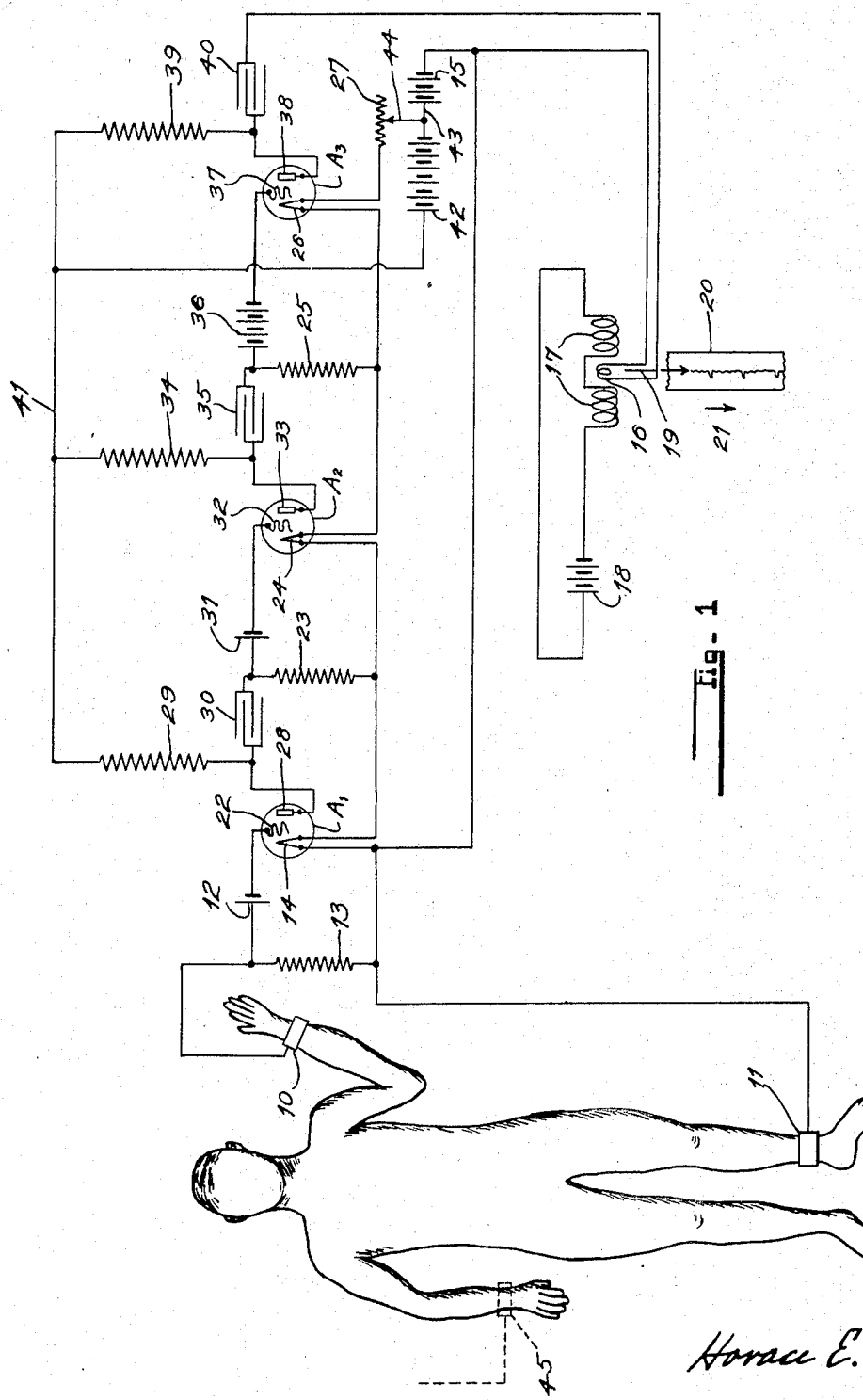

In carrying out my invention I make use of the electrical apparatus illustrated diagrammatically in Figure 1.

Figure 2:
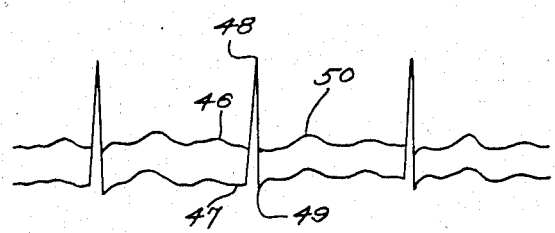
Figure 3:
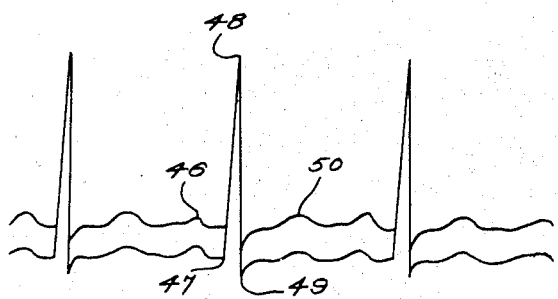
Figure 4:
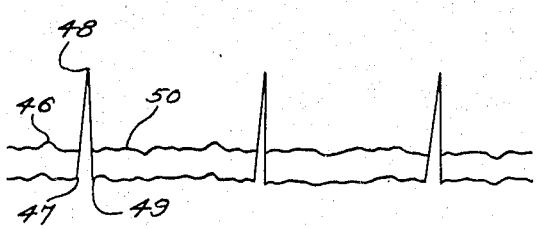
Figure 5:
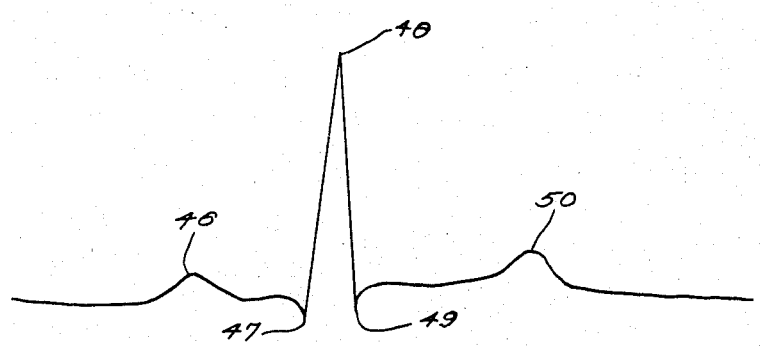

Fig. 2 shows the curve of electric potential produced by the muscles of the auricles and ventricles of a human heart when the electrodes are applied to both arms. Fig. 3 is a similar curve showing the electric potential so produced when the electrodes are applied to the right arm and left leg. Fig. 4 is a similar curve showing the electric potential so produced when the electrodes are applied to the left arm and left leg. Fig. 5 is an ideal curve showing the electric potential so produced when the electrodes are applied in the same manner as they are applied during the recording of the graph shown in Fig. 3.

In carrying out my invention I use two electrodes 10 and 11 which may be of any suitable material on the interior thereof and moistened with any suitable solution so that effective contact may be made between the skin of the patient and said electrodes.

In Fig. 1 the electrode 10 is applied to the left arm and the electrode 11 to the left leg. The electrode 10 is connected to the positive pole of the battery 12 and to one terminal of the resistance 13. The other terminal of the resistance 13 is connected to the electrode 11, to one terminal of the filament 14 of the audion $A_1$, to the negative pole of the battery 15 and to one terminal of the movable coil 16 of any approved form of galvanometer which is also provided with a pair of fixed coils 17—17 energized by the battery 18. To the coil 16 is to be fixed a pointer or recording stylus 19 adapted to make a graph in any approved manner upon the record 20 which is given a movement in the direction of the arrow 21 by any approved mechanism.

The negative terminal of the battery 12 is connected to the grid 22 of the audion $A_1$.

As before stated, the electrode 11 is connected to one terminal of the filament 14 and, consequently, said terminal of said filament also has connection with the other apparatus to which said electrode is connected. The other terminal of the filament 14 is connected to one terminal of the resistance 23 and to one terminal of the filament 24 of the audion $A_2$. In like manner the other terminal of the filament 24 is connected to the resistance 25 and to one terminal of the filament 26 of the audion $A_3$. The other terminal of the filament 26 is connected to the resistance 27.

The plate 28 of the audion $A_1$ is connected to one terminal of the resistance 29 and to one plate of the condenser 30. The other plate of the condenser 30 is connected to one terminal of the resistance 23 and to the positive pole of the battery 31, the other pole of which is connected to the grid 32 of the audion $A_2$.

The plate 33 of the audion $A_2$ is connected to one terminal of the resistance 34 and to one plate of the condenser 35, the other plate of which is connected to one terminal of the resistance 25 and to the positive pole of the battery 36, the other pole of which is connected to the grid 37 of the audion $A_3$. The plate 38 of the audion $A_3$ is connected to one terminal of the resistance 39 and to one plate of the condenser 40, the other plate of which is connected to one terminal of the movable coil 16 of the galvanometer.

As before described, the resistances 29, 34 and 39 have one terminal of each connected, respectively, to the plates of the audion $A_1$, $A_2$ and $A_3$ and also to one plate of the condensers 30, 35 and 40. The other terminals of said resistances are connected together by the wire 41 and said wire between the resistances 34 and 39 is connected to the positive pole of the battery 42, the negative pole of which is connected to the positive pole of the battery 15 by the wire 43 and said wire is connected to the contact maker 44 which is adapted to vary the portion of the resistance 27 included in circuit.

It is to be noted that the electrodes 10 and 11 are located to have impressed thereupon whatever difference of potential may exist at the particular portions of the patient's body with which they are in contact and that said terminals are connected primarily in a circuit including a battery or other source of electricity such as 12, the grid of the audion $A_1$ and one terminal of the filament 14.

It is also to be noted that said electrodes are shunted by the resistance 13. Furthermore, that the other terminal of the filament 14 and the plate of the audion $A_1$ are connected, respectively, to one terminal of the filament 24 of the audion $A_2$ and to one plate of the condenser 30, the other plate of which is connected to one pole of the battery 31, the other pole of which is connected to the grid 32 of the audion $A_2$, the resistance 23 serving as a shunt between said last-named terminal of the filament 14 and the last-named plate of the condenser 30. This last-named group of connections and apparatus between the audions $A_1$ and $A_2$, together with the audions $A_1$ and $A_2$ and the resistance 29, serve to step up the variations of potential impressed upon the audion $A_1$ by the potential developed in connection with the operation of the muscles of the patient.

A similar group of connections and apparatus between the audions $A_2$ and $A_3$, together with the audions $A_2$ and $A_3$ and the resistance 34, serve to step up the variations of potential impressed upon the audion $A_2$, and it is evident that there may be any number of similar groups of connections and apparatus and audions in order to step up the potential to any point desired.

Variations in potential impressed upon the filament 26 and plate 38 of the last audion are induced upon the terminals of the coil 16 by the condenser 40.

As will be readily understood, the condenser 30, in the illustrative circuit shown, has a double function effect, being different in this respect from the succeeding condensers. Each of the condensers illustrated has the usual function of the condensers of an amplifying circuit, but the first condenser of the illustrated circuit—the condenser 30—has the additional function of suppressing the constant potential produced by the body activities and which is generally referred to as the skin potentials which are not of alternating or pulsating characteristic. Condenser 30 thus produces the results which would be obtained by the use of an additional condenser connected in the circuit leading to audion $A_1$ (located in the primary circuit, for instance), with conidenser 30 then performing the same function as the remaining condensers 35 and 40, such additional condenser serving to produce this suppressing effect. With condenser 30 having this double function, audion $A_1$ amplifies all of the potential values delivered through the primary circuit.

I find that the apparatus having the following specifications produces good results:

The resistances 13, 23 and 25 are each to be 2 megohms; the resistances 29 and 34 are each to be 300,000 ohms; the resistance 39 is to be 25,000 ohms; the resistance 27 is to be about 4 ohms and capable of being varied in increments or decrements of ¼ ohm or smaller.

The capacity of the condensers 30 and 35 are each $\frac{1}{10}$ microfarad; the capacity of the condenser 40 is 4 microfarads. The batteries 12 and 31 each develop a potential of 1½ volts; the battery 36 develops a potential of 9 volts. The batteries 15 and 42 develop, respectively, potentials of 18 and 130 volts.

The audions $A_1$, $A_2$ and $A_3$ are of the types now manufactured and sold. The audions are all practically of the same construction, but $A_1$ and $A_2$ have higher impedances than $A_3$ so that less plate current will flow therethrough.

The coil 17—17 of the galvanometer and the energizing battery 18 may be of any suitable resistance and potential, respectively, so as to furnish a strong field for the movable coil 16. The latter may be of any suitable number of turns and mounted either on a pivot or with a unifilar or bifilar suspension and may revolve around a fixed paramagnetic core.

While I have given one set of specifications for the various apparatus employed, it is to be understood that many variations may be made in said specifications by those skilled in the use of said apparatus.

I find in operating my improved electrocardiograph that when the electrodes are connected to both arms, that is, as the electrode 10 is connected in Fig. 1 and as the electrode 11 would be connected if it were placed at 45 in Fig. 1, the stylus 19 makes a graph, the approximate envelope of which is shown in Fig. 2, in which the peak 46 indicates the potential developed in connection with auricular systole. The peaks 48 and 50 indicate the potentials developed in connection with ventricular systole and 47 and 49 represent the maximum depression of potential during the heart's action. When the electrode 11 is connected to the left leg as shown in Fig. 1 and the electrode 10 connected as shown dotted at 45 in said figure, a graph, the approximate envelope of which is shown in Fig. 3, is recorded by the stylus 19 and corresponding peaks and depressions are numbered as in Fig. 2.

When the electrodes 10 and 11 are connected as shown by full lines in Fig. 1, a graph, the approximate envelope of which is shown in Fig. 4, is recorded by the stylus 19 and corresponding peaks and depressions are numbered as in Fig. 3.

In Figs. 2, 3 and 4 the parallel wavy lines at the bottom of the graphs indicate the approximate envelopes of the extreme excursions of the single stylus 19 during the corresponding action of the heart, and in Fig. 5 the graph represents the average of these excursions.

While I have shown audions as suitable apparatus for stepping up the variations in potential produced in connection with the operation of a muscle, or muscles, of the patient so that the variations in potential on the plate of the last audion shall bear relations to the variations of potential developed in connection with the operation of the patient's muscles, it is to be understood that I do not intend to limit myself broadly to the use of an audion for stepping up the initial potentials except in those claims wherein the audion is claimed specifically.

My cardiograph is also useful whether the operation of the muscular fibre results in stress, motion or if chemical action or other change takes place in the fibre. It can also be applied for recording the potentials developed as a concomitant of any change of state of any material.

The electrodes may be applied to the body containing the material or to the material directly.

While I have shown my cardiograph arranged for recording, I do not wish to be limited thereby, for it is evident that the pointer 19 may carry a mirror to indicate its excursions.

I claim:—

1. The method of recording characteristics of muscular activities within living bodies, which consists in establishing a combined primary and amplifying circuit with the primary including selected portions of the living body, delivering to the established circuit the potential values produced by the normal activities of such living body including the potential values produced by the specific muscular activity being tested, and through the action of the established circuit suppressing the potential values of constant potential characteristics and recording the potential values of differential potential characteristic present within the potential values delivered to the established circuit.

2. In a device for recording characteristics of muscular activities within living bodies, an amplifying circuit adapted to be rendered active by the potential values produced by potentials set up by the normal activities of the living body, means operatively connected to such circuit for obtaining from the body the potential values thus set up, said means including electrodes secured to the body at spaced points of such body, whereby the potential values of such normal activities including those of the muscular activity being tested will be delivered to the amplifying circuit, means within and forming a part of the amplifying circuit for suppressing all constant potential values delivered thereto, and means for recording the unsuppressed potential values.

3. Means as in claim 2, characterized in that the suppressing means includes a condenser formation within the amplifying circuit.

4. Means as in claim 2, characterized in that the amplifying circuit includes instrumentalities of the audion type.

In testimony whereof, I affix my signature.

HORACE E. NICHOLS.